United States Patent [19]

Virgilio et al.

[11] Patent Number: 5,228,381
[45] Date of Patent: Jul. 20, 1993

[54] TEMPERATURE CONTROLLED FOOD COOKER HAVING DEVICES FOR STIRRING FOODS WHILE COOKING

[76] Inventors: Pallotti Virgilio; Pallucchini Franco, both of c/o Pagmatron S.p.A. - Via Mazzini 114, 20035 Lissone (Milano), Italy

[21] Appl. No.: 828,035

[22] Filed: Jan. 30, 1992

[30] Foreign Application Priority Data

Feb. 7, 1991 [IT] Italy ............... MI91U-000097

[51] Int. Cl.$^5$ ............. A47J 27/00; A47J 44/00; B01F 7/16
[52] U.S. Cl. ............. 99/331; 99/348; 366/146; 366/261; 366/288; 366/314
[58] Field of Search ............. 99/331, 326, 325, 348, 99/453, 455, 468; 366/144, 145, 146, 287, 288, 261, 314, 601; 62/342, 343

[56] References Cited

U.S. PATENT DOCUMENTS

| | | | |
|---|---|---|---|
| Re. 19,295 | 8/1934 | Porkhill | 366/288 |
| 4,070,957 | 1/1978 | Korekawa et al. | 99/455 |
| 4,079,917 | 3/1978 | Popeil | 366/288 |
| 4,583,863 | 4/1986 | Pandolfi | 62/342 |
| 4,591,273 | 5/1986 | Meyer et al. | 366/288 |
| 4,643,583 | 2/1987 | Cecchini | 62/343 |
| 4,704,035 | 11/1987 | Kowalczyk | 366/601 |
| 4,762,057 | 8/1988 | Hirota et al. | 99/348 |
| 4,802,407 | 2/1989 | Negri et al. | 366/261 |
| 5,028,141 | 7/1991 | Stiegelmann | 366/288 |
| 5,031,518 | 7/1991 | Bordes | 99/348 |
| 5,048,402 | 9/1991 | Letournel et al. | 99/348 |

FOREIGN PATENT DOCUMENTS

| | | | |
|---|---|---|---|
| 1300128 | 6/1962 | France | 366/288 |
| 216133 | 2/1925 | United Kingdom | 366/146 |
| 686771 | 1/1953 | United Kingdom | 366/288 |
| 2196238 | 4/1988 | United Kingdom | 366/145 |

*Primary Examiner*—Timothy F. Simone
*Attorney, Agent, or Firm*—McGlew and Tuttle

[57] ABSTRACT

A food cooker is provided including a base provided with a heating plate and a temperature sensing element connected to temperature control devices. The sensing element is mounted on a sliding support so as to be maintained in contact with a bottom part of the pot. Provided inside the pot is a food stirring vane which is mounted in a rotating support driven from a motor located in the base. A vertical shaft extends upwardly through the center of the pot. Rotation of the shaft effects rotation of the support. The stirring vane receives rotational movement about an axis of the shaft from the support and receives further rotational movement about an axis passing through the vane by a gearing between the vane and the support.

4 Claims, 1 Drawing Sheet

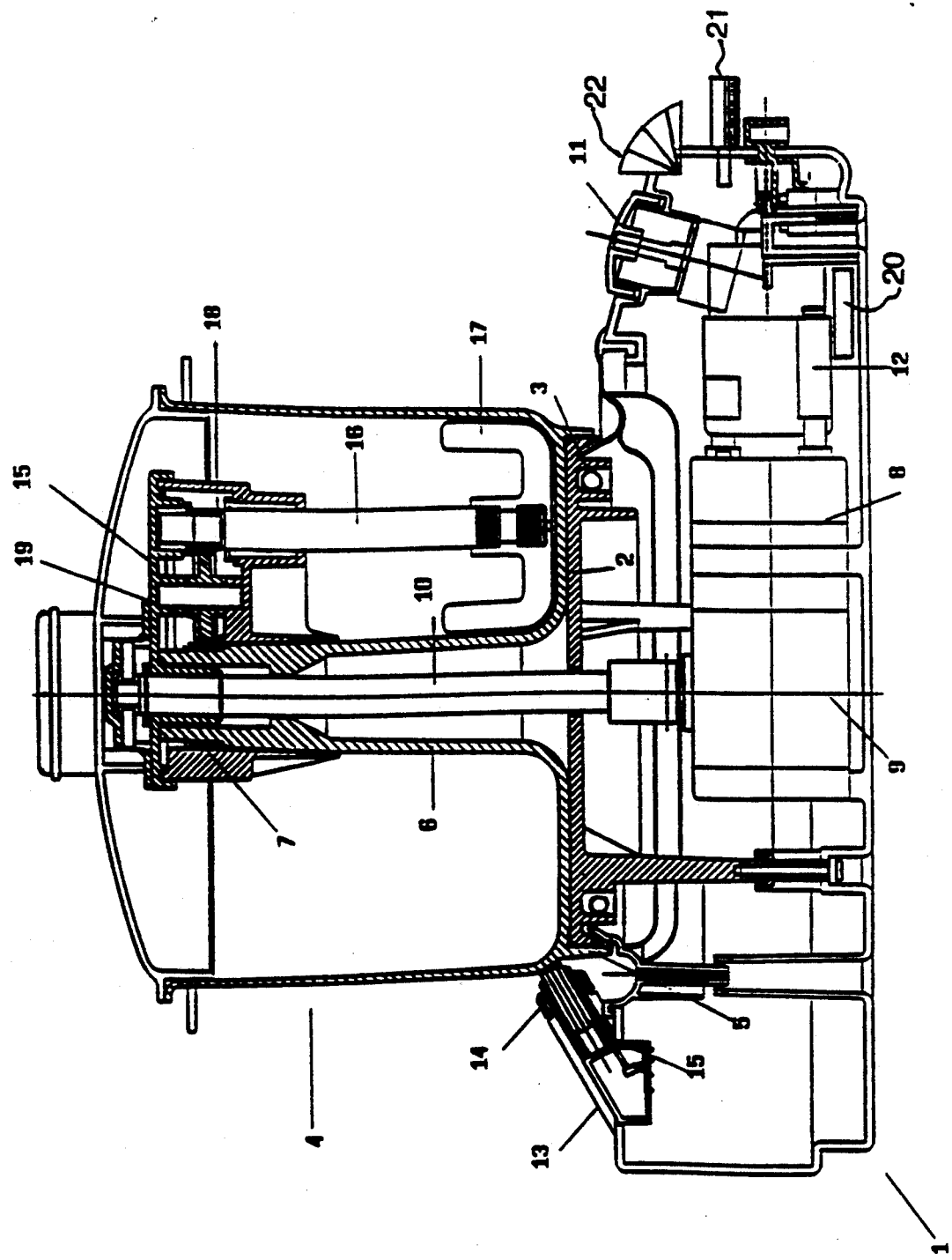

TEMPERATURE CONTROLLED FOOD COOKER HAVING DEVICES FOR STIRRING FOODS WHILE COOKING

This invention relates to a time and temperature controlled food cooker having devices associated therewith for stirring food while cooking.

FIELD OF THE INVENTION

This food cooker is of the type including a base provided with a heating plate and a pot mounted on the heating plate, wherein a sensing element is connected to temperature control devices and is mounted so to a slidable support as to be subject to the effect of elastic means which tend to constantly maintain the sensing element in contact with a bottom part of the pot.

This pot also includes a vane which is mounted to a rotating support and is driven from a gearmotor located in the base of the apparatus.

Provided in the food cooker are devices for controlling its different operations in a automatic manner, all of the above recited elements being fabricated into a compact unit designed for convenient and practical use.

BACKGROUND OF THE INVENTION

Small household electrical appliances, in particular small kitchen appliances, various types of food cookers, such as fryers, contrivances for preparing 'polenta' and the like foods, are well known in the art.

Some of these appliances include a heating plate having a heating element built therein and temperature control devices comprising, in general, a thermostat unit for controlling the temperature of the plate. In other cases, control of the temperature is achieved by means of a timer which cuts off power the supply when a given time is elapsed. Moreover, devices are known which include a vane means for mixing foods while cooking.

Thus, by way of example, one appliance for preparing the 'polenta' food, consists of a container to be put over a heat and to which a support is attached at the opening edge of the container for supporting a motor which drives the mixing vane.

SUMMARY OF THE INVENTION

It is within the above class of small kitchen electrical appliances that this invention ranges, which invention provides a food cooker equipped with a temperature sensing means mounted on a slinding support and submitted to the effect of means which maintain the sensor in contact with the bottom of the pot at any time.

The pot has a sleeve provided at a central region thereof to which a support for a vane is mounted and is caused to rotate by a motor that is arranged in the base of the appliance.

The sleeve has a fixed gear toothing which meshes with a gear mounted on the vane support in a free manner, the gear teeth meshing in turn with a gear toothing provided on the vane shaft so as to cause the vane shaft to rotate while the vane support turns about the sleeve axis.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

This invention will now be described in more details by way of example only, reference being made to the single FIGURE of the accompanying drawing which shows a sectional view of a food cooking appliance according to the invention.

This appliance comprises a base, broadly designated by 1 in the FIGURE, to which base 1 a heating plate 2 is attached and has a heating element 3 built therein.

The plate 2 is protruding out with respect to the upper wall of the base 1 so as to permit a pot, broadly indicated by 4, to be put in place thereon, this pot having at its bottom part a downwardly extending ridge 5 for close engagement around the plate 2.

Thus, the ridge 5 serves as an abutment for firmly holding the pot in place during cooking.

The pot has, at a central region inside it, a sleeve 6 provided at the top with a fixed gear toothing 7. Arranged in the base 1 is a gearmotor 8 unit which has a driving gear 9 for causing rotation of a substantially vertical shaft 10 passing through the sleeve 6. A knob 11 permits a device of a known type 12 to be acted upon so as to adjust the speed of motor 8.

Although not shown in the drawing, there are provided a timer device and a thermostat device, both of which are of well known types and are arranged for providing control for the motor 8 and the heating element 3, respectively.

Fixed to the base 1 is a support 13 within which a temperature sensor 14 is slidably mounted and is kept pressed against a bottom part of the pot by means of a helical spring 15 or the like. This sensor 14 is connected with the thermostat unit which controls the power supply to heating element 3.

Moreover, mounted for rotation on the sleeve 6 is a support 15 for a shaft 16 which has a vane 17 fixed to it, the vane 17 being arranged close to the bottom of pot 4.

The shaft 16 is provided with a gear toothing 18. Furthermore, a gear 19 is mounted on the support 15 in a free manner and meshes with both the fixed toothing 7 on sleeve 6 and the gear toothing 18 on shaft 16.

Operation is as follows.

After the pot 4 containing the food to be cooked is put on the plate 2 with the outer ridge 5 of the pot accurately engaging around the plate 2 so as to ensure that the pot is firmly kept in place, the control knob 11, as well as other necessary control knobs 21 provided on the body of the appliance for adjusting the cooking temperature and time, and the velocity of vane 17, are acted upon as required.

The sensor 14 is maintained pressed against the lowermost part of pot 4 by the spring 15 in order to permanently sense temperature to permit the thermostat unit to cut-off power supply upon a desired value of this latter having been reached.

At that time, the assembly comprising the support 15 with the shaft 16 and the vane 17 associated therewith, is mounted on to the sleeve 6 and is fastened to shaft 10 so as to ensure that the teeth of gear 19 should be in mesh with the corresponding fixed gear toothing on sleeve 6.

Then, the motor 8 is operated to cause the shaft 10 and, thus, the support 15, to rotate through the transmission gear 9. Through rotation of support 15, the shaft 16 is also brought into motion, the shaft 16 being imparted with a revolution motion about the axis of shaft 10 and a rotation motion about its own axis, this latter motion being transmitted via the idle gear 19.

As a result, the vane 17 is rotated about its own axis and is at the same time caused to slide over the bottom of pot 4 at a velocity which can be adjusted by the regulator device 12 through action on knob 11.

When cooking is completed, it is sufficient to release the assembly 15 from engagement with transmission gear 9 and to withdraw the shaft 10 from sleeve 6 to permit the pot 4 to be removed.

As it should be clearly apparent from the above description, the invention provides a food cooker which is extremely practical in use, this food cooker enclosing in a very compact unit all of the devices that are necessary to control the different functions of the appliance, such as the time and the temperature of cooking, as well as the stirring rate of the food in the pot, with all of the devices being easy to operate through well accessible control knobs from the outside. The control devices can also be controlled from a microprocessor 20 (COP) and one or more digital keyboards 22 depending on the complexity of the required functions.

Moreover, the assembly is simple to disassemble for servicing or repairing and is safe in operation.

It should also be apparent to persons skilled in the art, that many other embodiments of the invention may be thought on the basis of the inventive principle as referred to above and may involve changes relating to the dimensions of the components or the materials used for the construction thereof, according to particular application requirements.

We claim:

1. A food cooker of the type including a base and heating plate comprising: a container for containing food to be cooked and arranged for mounting on the heating plate; a heating element and a thermostat controlling said heating element, said thermostat including a sensor mounted to a sliding support and an elastic means biasing said sensor against a bottom part of said container, said container including an internal sleeve, a fixed gear toothing provided on an annular edge of said sleeve, a shaft passing through said sleeve, said shaft being driven by a gearmotor arranged in the base, said sleeve having a support mounted for rotation on said sleeve, said support supporting a shaft, a vane on said shaft for stirring the food in said container, said shaft being provided with a gear toothing, an idle gear rotatably connected to said support and being arranged for mating with both of said sleeve fixed toothing and said shaft gear toothing.

2. A food cooker according to claim 1 wherein the base includes control devices for controlling a time of cooking, the velocity of said vane and a temperature of cooking.

3. A cooker according to claim 2 wherein said control devices are controlled from a microprocessor (COP) and one or more digital keyboards.

4. A cooker according to claim 2 wherein said control devices are adjusted by means of control knobs, said control knobs being mounted to a wall of the base.

* * * * *